US008861532B2

(12) United States Patent
Jang et al.

(10) Patent No.: US 8,861,532 B2
(45) Date of Patent: Oct. 14, 2014

(54) APPARATUS AND METHOD FOR IDENTIFYING AN ACCESS NETWORK OF A NETWORKED TERMINAL

(71) Applicant: NHN Corporation, Seongnam-si (KR)

(72) Inventors: Jae Wan Jang, Seongnam-si (KR); Il Hwan Kim, Seongnam-si (KR); Kyoung Won Suh, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 162 days.

(21) Appl. No.: 13/687,252

(22) Filed: Nov. 28, 2012

(65) Prior Publication Data

US 2013/0170367 A1 Jul. 4, 2013

(30) Foreign Application Priority Data

Nov. 28, 2011 (KR) ........................ 10-2011-0124832

(51) Int. Cl.
*H04L 12/28* (2006.01)
*H04W 48/18* (2009.01)
*H04W 48/16* (2009.01)

(52) U.S. Cl.
CPC .............. *H04W 48/16* (2013.01); *H04W 48/18* (2013.01)
USPC .................. 370/395.21; 370/389; 370/395.41

(58) Field of Classification Search
CPC ..... H04L 47/10; H04L 12/56; H04L 2012/56; H04W 40/02; H04W 40/24; H04W 40/34
USPC ......... 370/389, 358, 360, 396, 395.21, 395.4, 370/395.41, 395.43, 395.5
See application file for complete search history.

(56) References Cited

U.S. PATENT DOCUMENTS

| | | | | |
|---|---|---|---|---|
| 6,047,322 | A * | 4/2000 | Vaid et al. | 709/224 |
| 2002/0176443 | A1* | 11/2002 | Wei et al. | 370/468 |
| 2013/0091268 | A1* | 4/2013 | Bopardikar et al. | 709/224 |

FOREIGN PATENT DOCUMENTS

| | | |
|---|---|---|
| CA | 2606632 | 4/2008 |
| KR | 2008-0036538 | 4/2008 |

* cited by examiner

*Primary Examiner* — Brenda H Pham
(74) *Attorney, Agent, or Firm* — Greer Burns & Crain Ltd.

(57) ABSTRACT

Disclosed herein is an apparatus and method of identifying an access network. The apparatus including: a packet capturing unit configured to capture a plurality of packets transmitted or received by a server; a flow classifying unit configured to classify each of the captured packets into individual flows with reference to at least one of an origination address, a destination address, and a port number; a round trip time (RTT) calculating unit configured to calculate RTT values from the packets classified into a flow of the individual flows; an access network determining unit configured to determine that an origination address included in a packet classified into the flow is an address accessing the server through a first communication network when the RTT calculated values exceed a reference value; and a storage unit configured to store the address accessing the server through the first communication network.

20 Claims, 11 Drawing Sheets

Start capture packets transmitted/received in server ~S701 classify packets of same TCP connection among captured packets into same TCP flow ~S702 determine 3G IP using RTT in respective TCP flows ~S703 store determined result in database ~S704

End

APPARATUS AND METHOD FOR IDENTIFYING AN ACCESS NETWORK OF A NETWORKED TERMINAL

CROSS-REFERENCE TO RELATED APPLICATIONS

This application claims priority from and the benefit of Korean Patent Application No. 10-2011-0124832, filed on Nov. 28, 2011, which is hereby incorporated by reference in its entirety for all purposes as if fully set forth herein.

BACKGROUND

1. Field

The present disclosure relates to an apparatus, a method, and a computer readable recording medium for identifying an access network of a terminal, and more particularly, to an apparatus, a method, and a computer readable recording medium capable of identifying and classifying various kinds of networks accessed by the terminals to communicate with a server.

2. Discussion of the Background

At present rapid development to a wireless mobile communication technology beyond wired communication has been made and led to a diffusion of the Internet. Users can search for information on the Internet through a portable terminal such as a cellular phone, a personal digital assistant, a handheld computer, or the like, regardless of time or location.

Many users have replaced general cellular phones with the smart phones. The smart phone, which is an intelligent cellular phone having computer support functions added to the cellular phone, has a personal digital assistant (PDA) function, an Internet function, a moving picture reproducing function, and the like, added thereto while satisfying cellular phone functions. The smart phone can also include various input schemes and touch screens to provide an interface that is more convenient for use. In addition, as the smart phone supports a wireless Internet function, it can also access the Internet and perform functions of a general personal computer (PC), such as an E-mail function, a web browsing function, a fax function, a banking function, a game function, and the like. The smart phone typically includes a standardized operating system (OS) or a dedicated operating system to implement various functions.

As described above, as implementation of various functions has been enabled through various portable terminals such as the smart phone, and the like, various dedicated application programs and contents driven to a user terminal have also been developed.

Additionally, various dedicated application programs implemented in the portable terminal need high-speed network traffic. These application programs transmit and receive a large amount of data in a short time. Therefore, in driving the application program in the portable terminal, a quality problem of the network becomes an important issue, and whether or not a service may be smoothly provided may be determined according to what kind of network is used.

For example, when an application program executed in the portable terminal uses a network according to the third generation mobile communication scheme (that is, a network in the 3G scheme), a smooth traffic speed is not supplied and it is difficult to provide an appropriate service. However, when an application program executed in the portable terminal accesses a network providing relatively stable and high speed data communication, such as Wi-Fi, or the like, a service may be smoothly provided. In addition, according to a kind of network, when the network is in the 3G scheme, an additional cost may be added according to a usage of the network. Therefore, it is important for the portable terminal to identify an access network and inform a user that the additional cost may be generated.

FIGS. 1A and 1B illustrate a guide message related to a kind of access network in a general portable terminal. Referring to FIG. 1A, when a specific application program is executed in a portable terminal 100, when an executed application program needs a large amount of network traffic, the portable terminal 100 may inform a user that the executed application program needs a large amount of network traffic and notify the user that an additional cost may be incurred. For example, the portable terminal may display texts such as 'A connection is made in a 3G scheme. A wireless data fee may be incurred', or the like, to allow the user to determine whether or not a corresponding program will be continuously executed.

In addition, referring to FIG. 1B, when the user intends to access a network that does not ensure a stable and high transmission speed to execute a specific application program, the portable terminal notifies the user to limit provision of a corresponding service as shown in FIG. 1B. For example, in order to view a television broadcast, a significantly large amount of traffic and a stable and high transmission speed are needed. Therefore, generally, the corresponding service may not be smoothly provided through a 3G network and may be smoothly provided only when the portable terminal accesses a Wi-Fi network. Therefore, as shown in FIG. 1B, the portable terminal may display texts such as 'Please note that a television sport broadcasting is supported only in a Wi-Fi state for uninterrupted viewing', or the like, to induce access to the Wi-Fi network.

As described above, in order to recognize a charging problem and network quality according to the use of the 3G network, whether the user terminal (that is, the portable terminal) accesses the 3G network or the Wi-Fi network should be recognized. That is, it is preferable to inform the user that an additional cost may be incurred due to an access through the 3G network at the time of using a service such as download of a large file, or the like, as shown in FIG. 1A. It is also preferable to inform the user that quality of a service may not be ensured due to speed and stability problems of the 3G network in a streaming service when the quality of the service may not be ensured and limit the service if necessary, as shown in FIG. 1B.

A portable terminal including a specific operating system (for example, iOS, Android, or the like) provides an application programming interface (API) capable of confirming whether the portable terminal is currently accessing the 3G network or the Wi-Fi network.

However, when the portable terminal accesses a webpage providing a web service using its browser, an API informing whether the portable terminal is accessing the 3G network or the Wi-Fi network is not provided in the browser. Therefore, whether the access network of the portable terminal of each user is the 3G network or the Wi-Fi network needs to be recognized at a server side.

As described above, as one of methods of confirming whether or not the portable terminal of the user is using the 3G network at the server side, the server may distinguish is whether he/she is accessing and using the 3G network or the Wi-Fi network based on an Internet Protocol (IP) address through which the user accesses the network.

That is, according to the related art, the server receives a list of specific IP addresses allocated for the 3G network from an operator providing the 3G network and compares the list of the IP addresses with an IP address of the portable terminal accessing the 3G network, thereby making it possible to confirm whether or not the portable terminal accesses the 3G network. However, in the related art as described above, when the 3G network operator does not provide the list of the IP addresses, a state in which the portable terminal accesses the network may not be identified at all.

In addition, even though the server has received the list of the IP addresses from the 3G network operator, the 3G network operator may often change the list of the allocated IP addresses. In this case, unless the server receives the updated list of the IP addresses from the 3G network operator immediately, it is likely that an error in identifying whether or not the user has accessed the 3G network will occur.

Furthermore, when the server depends on the list of the IP addresses received from the 3G network operator, since it is likely that the operator will change the list of the IP address allocated to a mobile communication scheme, when a new kind of wireless network such as the 4G network including the Wireless Broadband (WiBro), the long term evolution (LTE), or the like, in addition to the 3G network, is deployed.

In Korean Patent Laid-Open Publication No. 2008-0036538 entitled "Apparatus, and Associated Method, by Which to Stored Specific Network Identifiers at a Wireless Device" (applicant: Research in Motion, Limited) has disclosed a method of storing a wireless network identifier and identifying a specific type of wireless network through the wireless network identifier. However, since this identifying method carried out in a portable terminal, a server may not identify an access network of a terminal when the terminal does not notify the server of the access network.

SUMMARY

Exemplary embodiments of the present invention provide an apparatus, a method, and a computer readable recording medium for identifying an access network of a user terminal using a Round Trip Time (RTT) in a Transmission Control Protocol (TCP) flow without provision of access network information from a network operator.

Exemplary embodiments of the present invention also provide an apparatus, a method, and a computer readable recording medium for reliably identifying an access of the user terminal through a 3G network or another mobile communication scheme without provision of information from a network operator.

According to an exemplary embodiment, there is provided an apparatus for identifying an access network, the apparatus comprising: a packet capturing unit configured to capture a plurality of packets transmitted or received by a server; a flow classifying unit configured to classify each of the captured packets into individual flows with reference to at least one of an origination address, a destination address, and a port number; a round trip time (RTT) calculating unit configured to calculate RTT values from the packets classified into a flow of the individual flows; an access network determining unit configured to determine that an origination address included in a packet classified into the flow is an address accessing the server through a first communication network when the RTT calculated values exceed a reference value; and a storage unit configured to store the address accessing the server through the first communication network.

14. According to an exemplary embodiment, there is provided a method for identifying an access network, the method comprising: capturing with a packet capturing unit a plurality of packets transmitted or received by a server; classifying with a flow classifying unit each of the captured packets into individual flows with reference to at least one of an origination address, a destination address, and a port number; calculating with a round trip time (RTT) calculating unit, RTT values from the packets classified into a flow of the individual flows; determining with an access network determining unit that an origination address included in a packet classified into the flow is an address accessing the server through a first communication network when the RTT calculated values exceed a reference value; and storing with a storage unit the address accessing the server through the first communication network.

According to an exemplary embodiment, there is provided one or more non-transitory computer-readable storage media having stored thereon a computer program that, when executed by one or more processors, causes the one or more processors to perform acts comprising: capturing with a packet capturing unit a plurality of packets transmitted or received by a server; classifying with a flow classifying unit each of the captured packets into individual flows with reference to at least one of an origination address, a destination address, and a port number; calculating with a round trip time (RTT) calculating unit, RTT values from the packets classified into a flow of the individual flows; determining with an access network determining unit that an origination address included in a packet classified into the flow is an address accessing the server through a first communication network when the RTT calculated values exceed a reference value; and storing with a storage unit the address accessing the server through the first communication network.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1A:
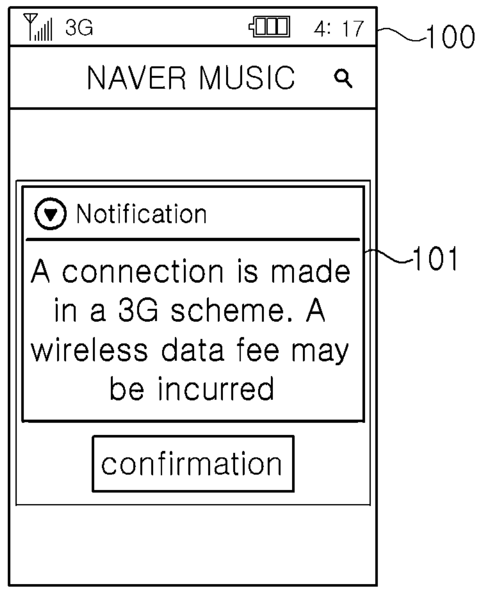
FIGS. 1A and 1B illustrate a guide message related to a kind of access network in a general portable terminal.
Figure 1B:
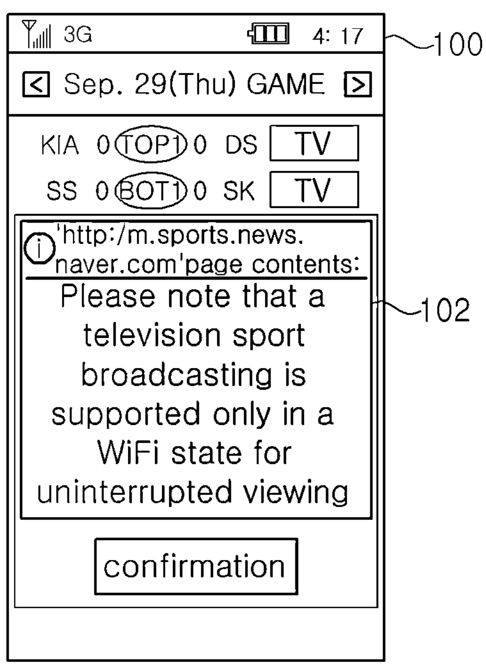

Exemplary embodiments of the present invention will be described in detail with reference to the accompanying drawings. These exemplary embodiments will be described in detail for those skilled in the art in order to practice the present invention. It should be appreciated that various exemplary embodiments of the present invention are different but do not have to be exclusive. For example, specific shapes, configurations, and characteristics described in an exemplary embodiment of the present invention may be implemented in another exemplary embodiment without departing from the spirit and the scope of the present invention. In addition, it should be understood that position and arrangement of individual components in each disclosed exemplary embodiment may be changed without departing from the spirit and the scope of the present invention. Therefore, a detailed description described below should not be construed as being restrictive. In addition, the scope of the present invention is defined only by the accompanying claims and their equivalents if appropriate. Similar reference numerals will be used to describe the same or similar functions throughout the accompanying drawings. It will be understood that for the purposes of this disclosure, "at least one of X, Y, and Z" can be construed is as X only, Y only, Z only, or any combination of two or more items X, Y, and Z (e.g., XYZ, XYY, YZ, ZZ).

Although a term 'portable terminal' has been used throughout the entire detailed description for convenience of explanation, exemplary embodiments of the present invention may be applied to any terminal capable of providing functions of the present invention as well as a smart phone, which is a representative device of the portable terminal. For example, exemplary embodiments of the present invention may be applied to all user terminals capable of executing an application, including a fixed terminal such as a computer, a television, or the like, as well as a portable terminal such as the smart phone, a laptop computer, a digital broadcasting terminal, a Personal Digital Assistant (PDA), a Portable Multimedia Player (PMP), a navigation apparatus, or the like, and is preferably applied to a terminal that may access at least one wireless network.

Further, in exemplary embodiments of the present invention, a method of identifying an access through a 3G mobile communication network among various communication networks accessed by user terminals will be described. However, the method according to the present invention is not limited only to the identification of the 3G mobile communication network, but may also be applied to a method of identifying any other mobile communication network.

In addition, although exemplary embodiments of the present invention have been described based on an Internet protocol (IP) address for convenience of explanation, a network access used and identified in exemplary embodiments of the present invention is not necessarily limited to networks that use an IP address.

Hereinafter, exemplary embodiments of the present invention will be described in detail with reference to the accompanying drawings so that those skilled in the art may easily implement the spirit of the present invention.

Concept of Identification of Access Network

Network operators (for example, the 3G mobile communication network operators) generally manage IP addresses for different networks separately. For example, the network operators can allocate an IP address range to a wired network such as an optic local area network (LAN), an asymmetric digital subscriber line (ADSL), a cable, or the like, and a different IP address range for the 3G mobile communication network, such that the two ranges do not overlap.

When it is confirmed through which access network the access IP addresses of the respective user terminals are accessed, all of the user terminals that subsequently access networks using the same IP address access the same kind of network as a kind of previous access network. The access IP addresses of the user terminals are stored with confirmed kinds of networks in a database. This permits for identification of kinds of access networks of the user terminals that subsequently access networks. Since there is a case in which the network operator regularly or irregularly changes the allocated IP addresses, data stored in the database according to the exemplary embodiment may also be regularly or irregularly updated.

Figure 2:
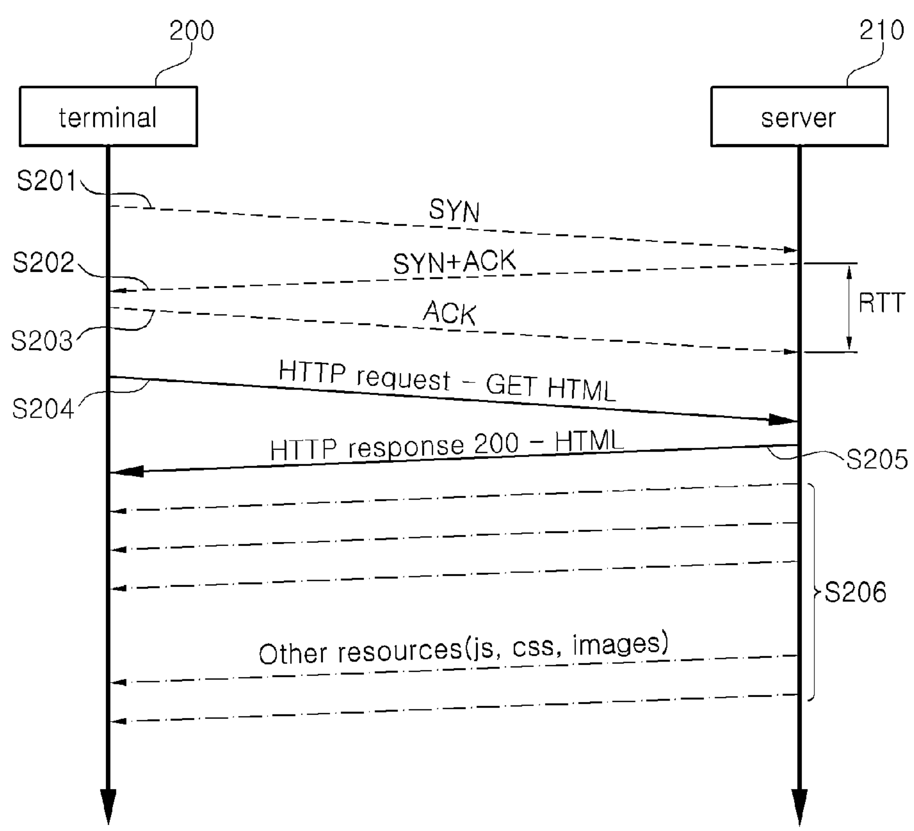
FIG. 2 illustrates a signal transmitting/receiving procedure between a terminal and a server according to a transmission control protocol (TCP) flow.

FIG. 2 illustrates a signal transmitting/receiving procedure between a terminal and a server according to a transmission control protocol (TCP) flow. Referring to FIG. 2, at the time of network connection between a terminal 200 and a server 210, a TCP connection setting procedure as shown in FIG. 2 is performed.

As TCP provides a reliable connection, a predefined protocol called '3-way handshake' is executed in advance before communication between the terminal 200 and the server 210 is actually performed. As a first step, the terminal 200 transmits an 'SYN packet' (synchronization message) requesting a connection to the server 210 (S201). When the server 210 normally receives the 'SYN packet' from the terminal 200, it transmits an 'SYN+ACK packet' (synchronization and acknowledge message) indicating that the connection request is accepted as a response to the corresponding terminal 200 (S202). When the terminal 200 receives the 'SYN+ACK packet' from the server 210, it confirms that communication is normally possible and transmits an 'ACK packet' to the server 210 (S203). Then, connection is made between the terminal 200 and the server 210 and data is actually exchanged therebetween.

A difference between a transmission time of the 'SYN+ACK packet' and a reception time of a corresponding 'ACK packet' in the server 210 is called a round trip time (RTT). Then, the terminal 200 transmits a data packet like a 'GET HTML packet' requesting specific information in a hypertext transfer protocol (HTTP) format to the server 210 (S204). The server 210 transmits the request information in the HTML format as a HTTP response to the terminal 200 (S205). Then, the server 210 additionally transmits various subsidiary other resources (for example, a JavaScript (JS)), a Cascading Style Sheet (CSS), an image, and the like) to the terminal 200 (S206).

In the TCP flow of the 3G mobile communication network as described above, the RTT indicates a predetermined reference value or more. Therefore, the server 210 confirms the RTT of the TCP flow according to the exemplary embodiment, such that it may identify an access network.

Hereinafter, a distribution of the RTT according to a kind of network will be described with reference to FIGS. 3 to 5.

Figure 3:
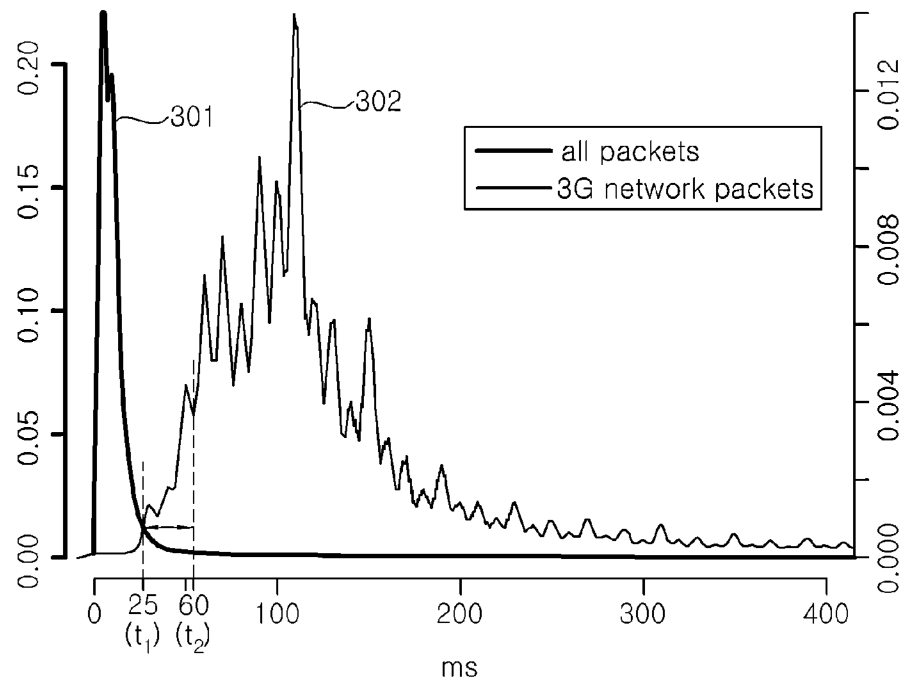
FIG. 3 is a graph illustrating round trip time (RTT) dispersion for "all packets" and "3G network packets" for an exemplary server.

FIG. 3 is a graph showing round trip time (RTT) dispersion for all packets and 3G network packets. More specifically, in FIG. 3, 'all packets' indicate an RTT value extracted from about two hundred and fifty million packets introduced into a specific Internet site for one day (a scale thereof is shown in a horizontal axis, and a scale of a distribution ratio thereof is shown in a left vertical axis). Since an absolute majority of the network packets accessed to the specific Internet site are introduced from a wired network (including Wi-Fi), it may be judged that 'all packets' in FIG. 3 indicate an RTT of the wired network including the Wi-Fi.

In addition, '3G network packets' indicate an RTT value extracted from one million packets introduced through an IP for the 3G provided by a network operator among packets entering a specific mobile site (a website optimized for a portable terminal) for one day (a scale thereof is shown in a horizontal axis, and a scale of a distribution ratio thereof is shown in a right vertical axis). Even though accuracy of a database provided from the network operator is partially considered among them, it may be judged that the '3G network packets' of FIG. 3 indicate an RTT of the 3G network.

It may be recognized with reference to FIG. 3 that the RTT of the 'all packets' representing the wired network is mainly distributed at 25 ms (t1) or less and the RTT (302) of the packets using the 3G network is distributed at 25 ms (t1) or more, more enough, 60 ms (t2) or more. Therefore, a specific range between 25 ms (t1) and 60 ms (t2) is set, and access networks are divided according to the RTT based on the set value, thereby making it possible to distinguish a kind of access network of each packet.

Figure 4:
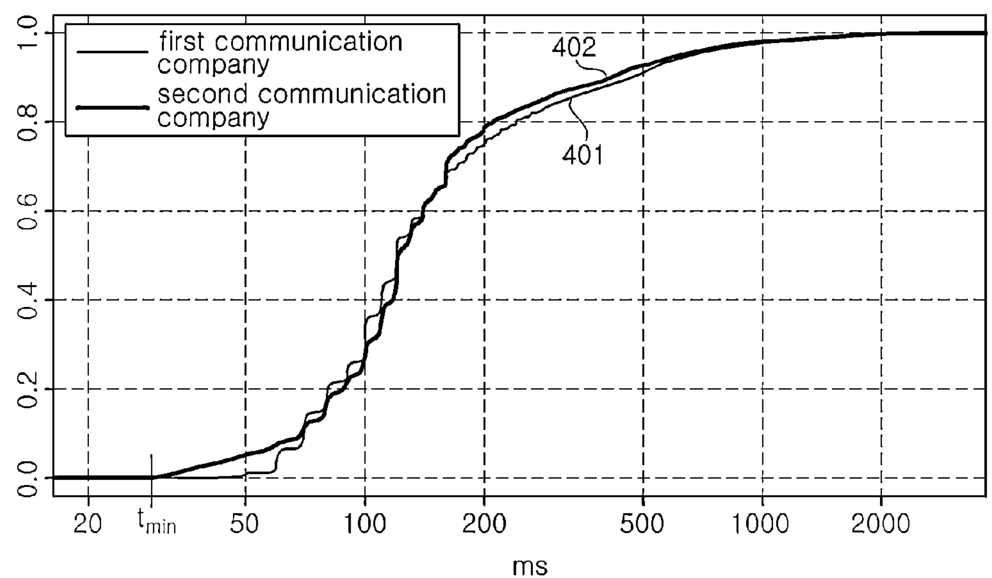
FIG. 4 is a graph comparing cumulative distribution functions (CDFs) of RTTs between mobile communication companies.

FIG. 4 is a graph comparing cumulative distribution functions (CDFs) of RTTs between two mobile communication companies providing a 3G mobile communication network with each other. Referring to FIG. 4, it may be appreciated that when an RTT 401 of packets accessed at an IP address allocated to the 3G network in a first communication company using a database provided from the first communication company and an RTT 402 of packets accessed at an IP address allocated to the 3G network in a second communication company using a database provided from the second communication company are represented by cumulative distribution functions (CDFs), RTTs in both of the communication companies have a specific value (Tmin) (for example, 30 ms) or more as a minimum value. That is, it may be appreciated that both of the communication companies of the 3G mobile communication network have an RTT of Tmin or more in the TCP flow.

Figure 5:
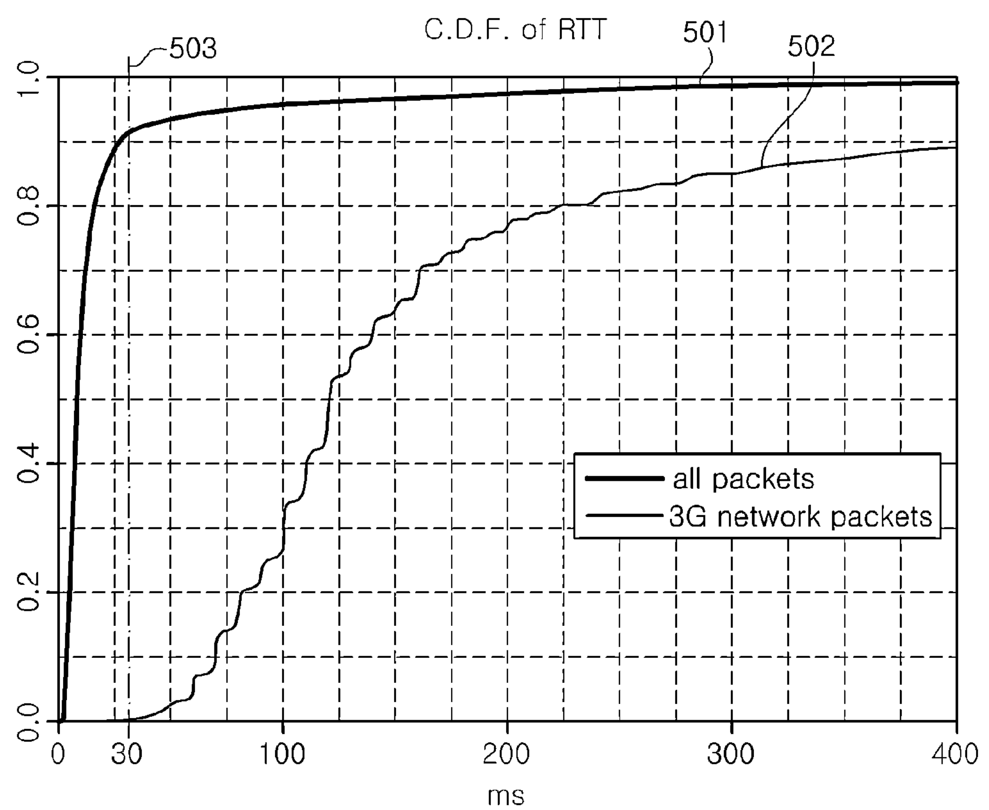
FIG. 5 is a graph of comparing CDFs for RTTs of all packets and 3G network packets with each other.

FIG. 5 is a graph of comparing CDFs for RTTs of 'all packets' and '3G network packets' shown in FIG. 3 with each other. Referring to FIG. 5, it may be appreciated that 90% or more of the RTT of 'all packets' is less than 30 ms, and most of the RTT of '3G network packets' is 30 ms or more. Therefore, the server inspects the RTT of the TCP flow of each reception packet, thereby making it possible to determine that packets having an RTT less than a reference value 503 (for example, 30 ms) are accessed not through the 3G network. That is, IPs of the packets having the RTT less than the reference value 503 are excluded from a list of terminal IPs of 'all packets.' Analogously, it is possible to identify IPs of the terminals communicating through the 3G network and store the 3G IP addresses in a database.

In FIG. 5, about 10% of packets having the RTT exceeding 30 ms among all packets may be packets accessed from an overseas network. That is, even though the packet is not communicated through the 3G mobile communication network, the packet communicated from the overseas terminal has a long latency (slow speed), such that a RTT thereof may exceed 30 ms. Therefore, the packets accessed from the overseas are additionally identified and filtered according to an exemplary embodiment.

Apparatus of Identifying of Access Network

Figure 6:
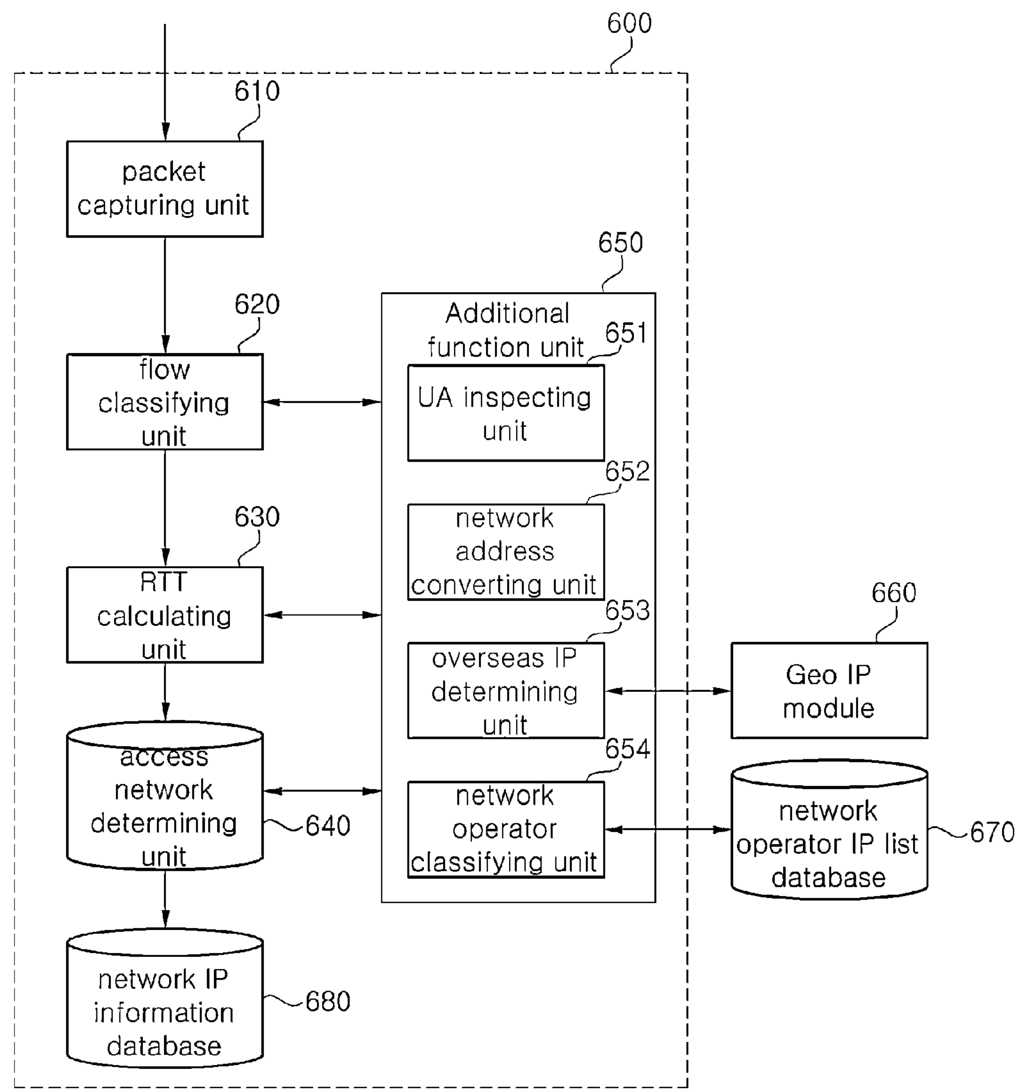
FIG. 6 illustrates a configuration of an apparatus for identifying an access network of a user terminal according to an exemplary embodiment.

FIG. 6 is a block diagram illustrating an apparatus for identifying an access network of a user terminal. Apparatus 600 for identifying an access network of a user terminal may be configured to include a packet capturing unit 610, a flow classifying unit 620, an RTT calculating unit 630, an access network determining unit 640, and the like. Information on a 3G network access IP determined by the connection network determining unit 640 is stored in a network IP information database 680.

Apparatus 600 for identifying an access network of a user terminal may include an additional function unit 650 to increase reliability for identification of the access network, wherein the additional function unit 650 may optionally include a user agent (UA) inspecting unit 651, a network address converting unit 652, and an overseas IP determining unit 653, and a network operator classifying unit 654.

The packet capturing unit 610 captures a plurality of packets received in a server. In this case, if possible, a server in which the number of TCP accesses of users is large captures the packets to increase reliability of an information analysis. When a user agent (hereinafter, referred to as a UA) performs an inspection, it is preferable that all of the received packets be captured. In some embodiments, only a TCP header portion (about 60 bytes or more) per each packet may be captured and analyzed.

As described above, when the packets received in the server are captured by the packet capturing unit 610, the flow classifying unit 620 classifies the captured packets into individual flows (hereinafter, a TCP flow will be described by way of example). That is, referring to FIG. 9, it is defined that all packets transmitted and received through one TCP connection between users with reference to origination addresses (that is, source addresses) 901, destination addresses 902, and each port information 903 and 904 of each packet in information of the received packets pertain to the same TCP flow.

Figure 9:
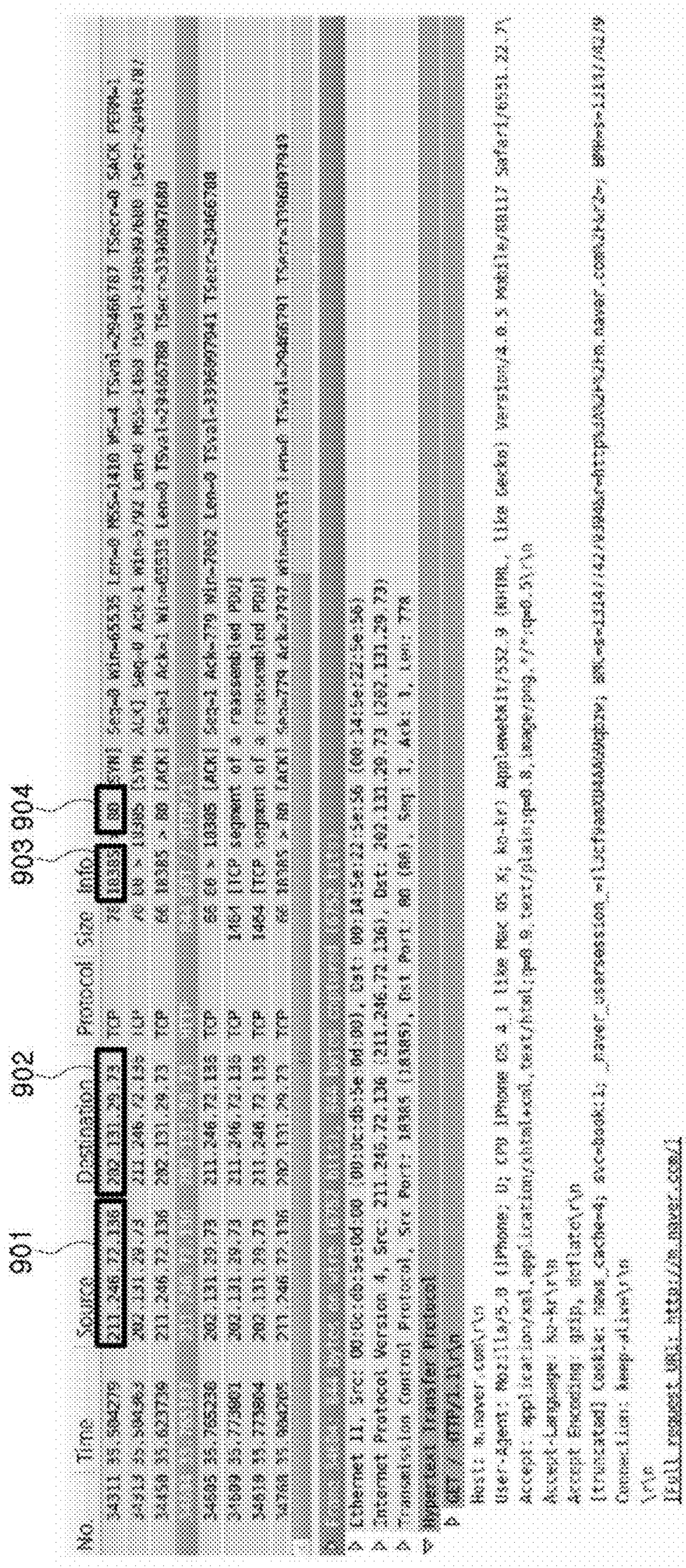
FIG. 9 illustrates a packet capture screen for classifying transmitting/receiving packets according to a TCP flow.

For example, it is preferable that packets transmitted and received through one TCP connection between a client having an IP address of '211.246.72.136' and using a port number '18385' and a server having an IP address of '202.131.29.83' and using a port number '80' as shown in FIG. 9 are considered as pertaining to one TCP flow.

Therefore, it may be appreciated that origination addresses, destination addresses, and port information of packets corresponding to each line in a capture screen of a packet analysis tool shown in FIG. 9 are the same as each other. That is, the packets are transmitted on one TCP flow. For example, since a No. '34311' packet, which is a first line, a No. '34450' packet, which is a third line, and a No. '34604' packet, which is a fourth line, have the same origination address, destination address, and each port number, it may be appreciated that they are packets transmitted from the terminal to the server on the same TCP flow. In addition, it may be appreciated that the remaining lines are also packets transmitted from the server to the terminal on the same TCP flow.

Next, the RTT calculating unit 630 calculates the difference between the transmission time of the 'SYN+ACK packet' and the reception time of the corresponding 'ACK packet' to calculate the RTT value.

That is, in FIG. 9, when an 'Info' field is confirmed, it may be appreciated that the second line is the 'SYN+ACK packet' (S202) on the TCP flow of FIG. 2 and the third line is 'ACK packet' (S203) on the TCP flow of FIG. 2. Therefore, a time difference (that is, 119.396 ms) between a packet reception time (35.504363 seconds) of the second line and a packet reception time (35.623739 seconds) of the third line becomes the RTT value.

As described above, when the RTT values of the respective TCP flows are calculated by the RTT calculating unit 630, the access network determining unit 640 determines a kind of access network of the packets configuring the corresponding TCP flow from the calculated RTT value. In this case, the access network determining unit 640 determines an access network of an IP address for the corresponding packet by presetting a reference value and comparing the calculated RTT value with the reference value.

Here, the reference value may be set to a value between 25 and 60 ms in the case of the 3G mobile communication network. Therefore, the TCP flow having the RTT value that exceeds the set reference value may be considered as a TCP flow that uses the 3G mobile communication network. On the other hand, the TCP flow having the RTT value that does not exceed the set reference value may be considered as a TCP flow that does not use the 3G mobile communication network. Different RTT value ranges can be specified for other mobile communication schemes.

In some embodiments, the number of TCP flows that use the 3G mobile communication network is compared with the number of TCP flows that do not use the 3G mobile communication network based on the RTT values per each IP of the clients (that is, the terminals) and the IP of the corresponding client is determined to be an IP using the 3G mobile communication network as the access network when the number of TCP flows considered as the TCP flows that use the 3G mobile communication network is larger than that of TCP flows considered as the TCP flows that do not use the 3G mobile communication network.

In some embodiments, to prevent the IP of the overseas access terminal having a relatively large RTT value from being erroneously classified into the 3G mobile communication network, when the sum of the number of TCP flows classified into the TCP flows that use the 3G mobile communication network in each IP and the number of TCP flows classified into the TCP flows that do not use the 3G mobile communication network in each IP is a predetermined number or less, that is, an access frequency through a specific IP address is low, the corresponding IPs may be excluded from a classification list of the 3G mobile communication network.

For example, when it is determined that the access network for the packets having the RTT value of 30 ms is the 3G mobile communication network, since the corresponding packets of the second and third lines of FIG. 9 have the RTT value exceeding 30 ms, it is judged that the access network for the corresponding packets is the 3G mobile communication network.

When the access network determining unit 640 determines the access network for the corresponding packet, both of the origination IP address of the packet received in the server and the determined information on the kind of network are mapped and stored in the network IP information database 680.

For example, '211.246.72.136', which is the origination IP address of the corresponding packet received in the server from the second and third lines of FIG. 9, is judged to be an IP address accessing through the 3G mobile communication network and is stored in the network IP information database 680. Therefore, the network IP information database 680 may store a list of all IP addresses accessing through the 3G mobile communication network.

In some embodiments, additional filtering is performed in the above-mentioned procedure by the additional function unit 650, thereby making it possible to more reliably identify the access network.

That is, the UA inspecting unit 651 of the additional function unit 650 inspects a UA item in header information of a HTTP request message (S204) captured through the specific TCP flow and confirms whether an operating system using the 3G mobile communication network is included in the UA item. When it is confirmed that an operating system is not using the 3G mobile communication network, the IP address of the corresponding packet is filtered and excluded from IP classification of the 3G communication network. That is, even when the RTT value is 30 ms or more as a calculation result of the RTT value, when it is proven that an operating system of the corresponding terminal is an operating system that may not access the 3G mobile communication network, such as 'Window XP' through the inspection of the UA item, it is highly likely that the network accessed by the corresponding terminal is not the 3G mobile communication network. Therefore, the UA inspecting unit 651 may perform additional filtering by confirming the header information of the packet.

Figure 10:
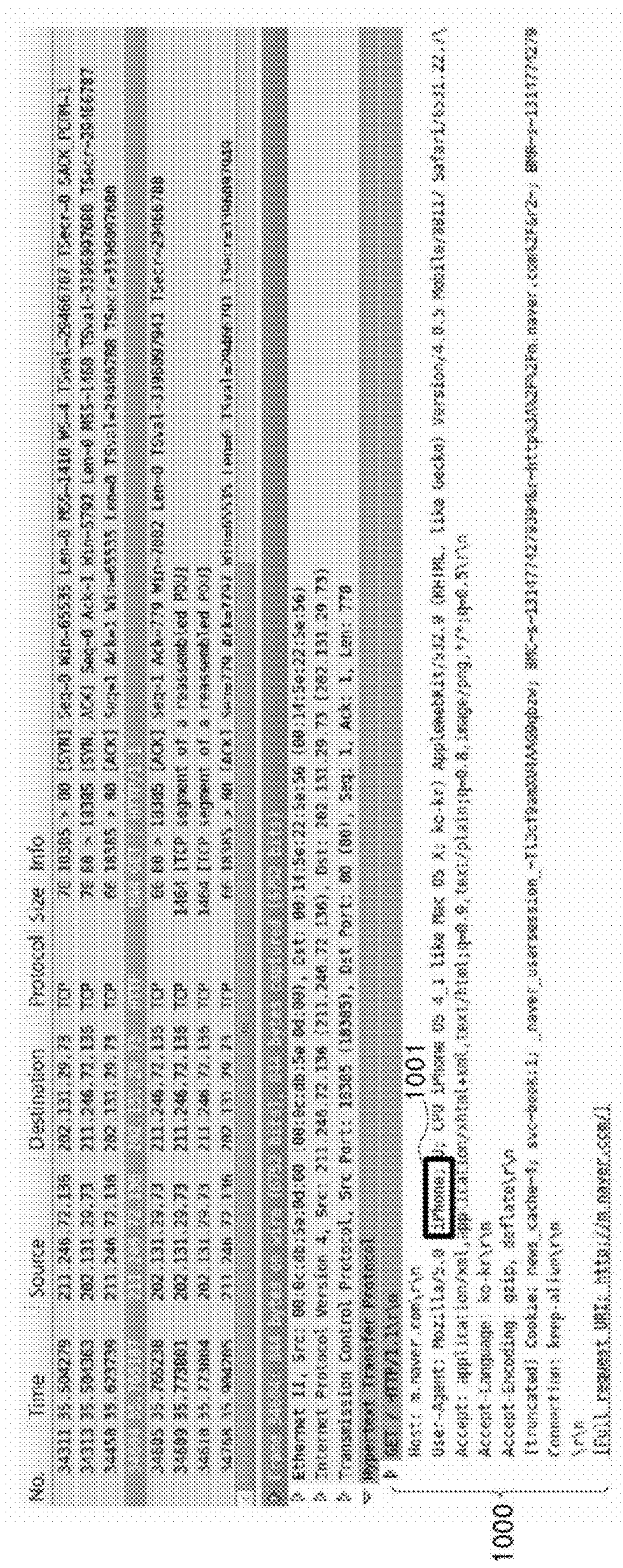
FIG. 10 illustrates a user agent (UA) item inspection in a packet capture screen.

For example, referring to FIG. 10, when confirming a UA item 1001 in header information 1000 of a packet of a fourth line (that is, a HTTP request message (S204)), it may be appreciated that 'iPhone'® is displayed. Since an operating system of the corresponding UA item 1001 is an operating system that supports the 3G mobile communication network, an IP address of the corresponding packet may not be excluded from classification of the 3G mobile communication network. On the other hand, when the operating system of the UA item 1001 is an operating system that does not support the 3G mobile communication network, since the corresponding packet is a packet that is not transmitted through the 3G mobile communication network, the IP address of the corresponding packet may be filtered and excluded from the classification of the 3G mobile communication network. Through the above-mentioned process, accuracy of the IP classification for the 3G communication network may be increased.

In addition, according to another exemplary embodiment of the present invention, the network address converting unit 652 converts the IP addresses of the clients (that is, the terminals) of each TCP flow into network addresses to determine an access network.

More specifically, only bits selected among upper 24-th to 31-th bits in an IP address configured of 32 bits may be used to be set to an IP address of the client of the corresponding TCP flow. For example, when the IP address of the terminal configured of 32 bits on the TCP flow is '211.246.72.136', '211.246.72', i.e., the upper 24-th bits, may be set to the IP address of the terminal of the corresponding TCP flow, and all IP addresses having the same upper 24-th bits may be determined to be the same access network.

The reason why the setting as described above is performed is that the network operators allocate all IP addresses pertaining to the same network address to the same network for convenience of management for the same network. The network address converting unit 652 may be more effectively used when the number of captured packets is small.

In addition, according to still another exemplary embodiment of the present invention, when the received packet is received from the overseas using a Geo IP module 660 including pre-built Geo IP addresses, the overseas IP determining unit 653 may exclude the received packet from a list of the 3G mobile communication networks.

Further, according to still another exemplary embodiment, the network operator classifying unit 654 may additionally determine network operators for the classified 3G access networks with reference to a network operator IP list database 670 received and stored from the outside, such as Korea Internet & Security Agency (KISA).

When the information on the access network for the IP address of the corresponding terminal and the information on the network operator are determined as described above, the determined information may be stored in the network IP information database 680 and be used for various services.

Method of Identifying of Access Network

Figure 7:
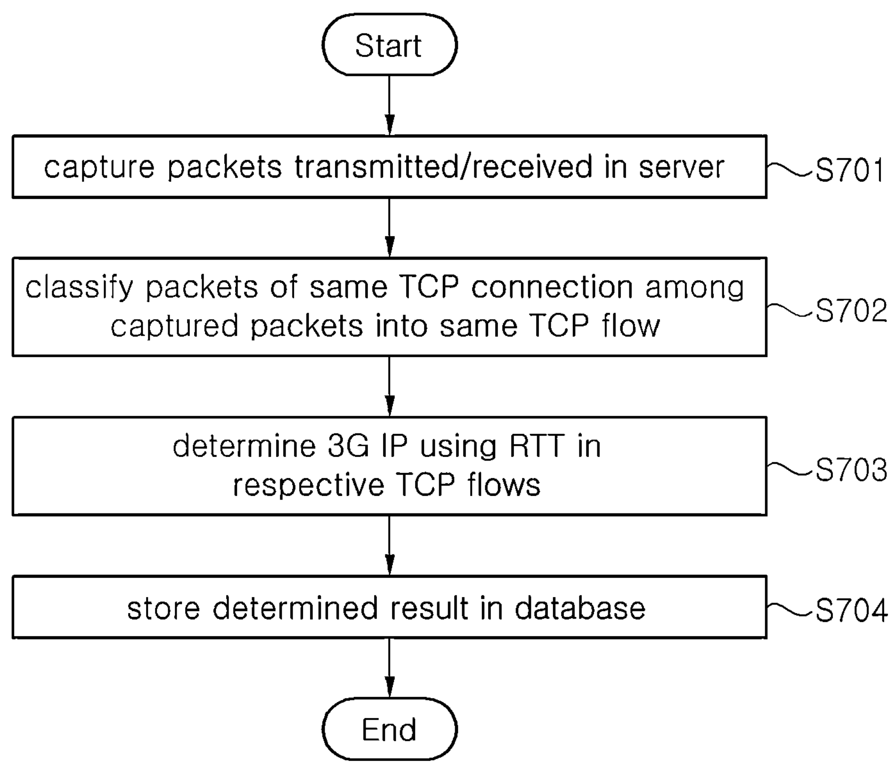
FIG. 7 is a flow chart illustrating a procedure of identifying an access network of a user terminal according to an exemplary embodiment.

FIG. 7 is a flow chart illustrating a procedure of identifying an access network of a user terminal according to another exemplary embodiment. Packets transmitted/received in the server are captured (S701). Then, packets of the same TCP connection (that is, packets having the same origination address, destination address, and each port number) among the captured packets are classified into the same TCP flow (S702).

Then, the RTT values in the respective TCP flows are calculated, and the IPs accessing the 3G mobile communication network are determined from the calculated RTT value (S703). The determined result may be stored in the database and be used to provide various service policies and services.

Figure 8:
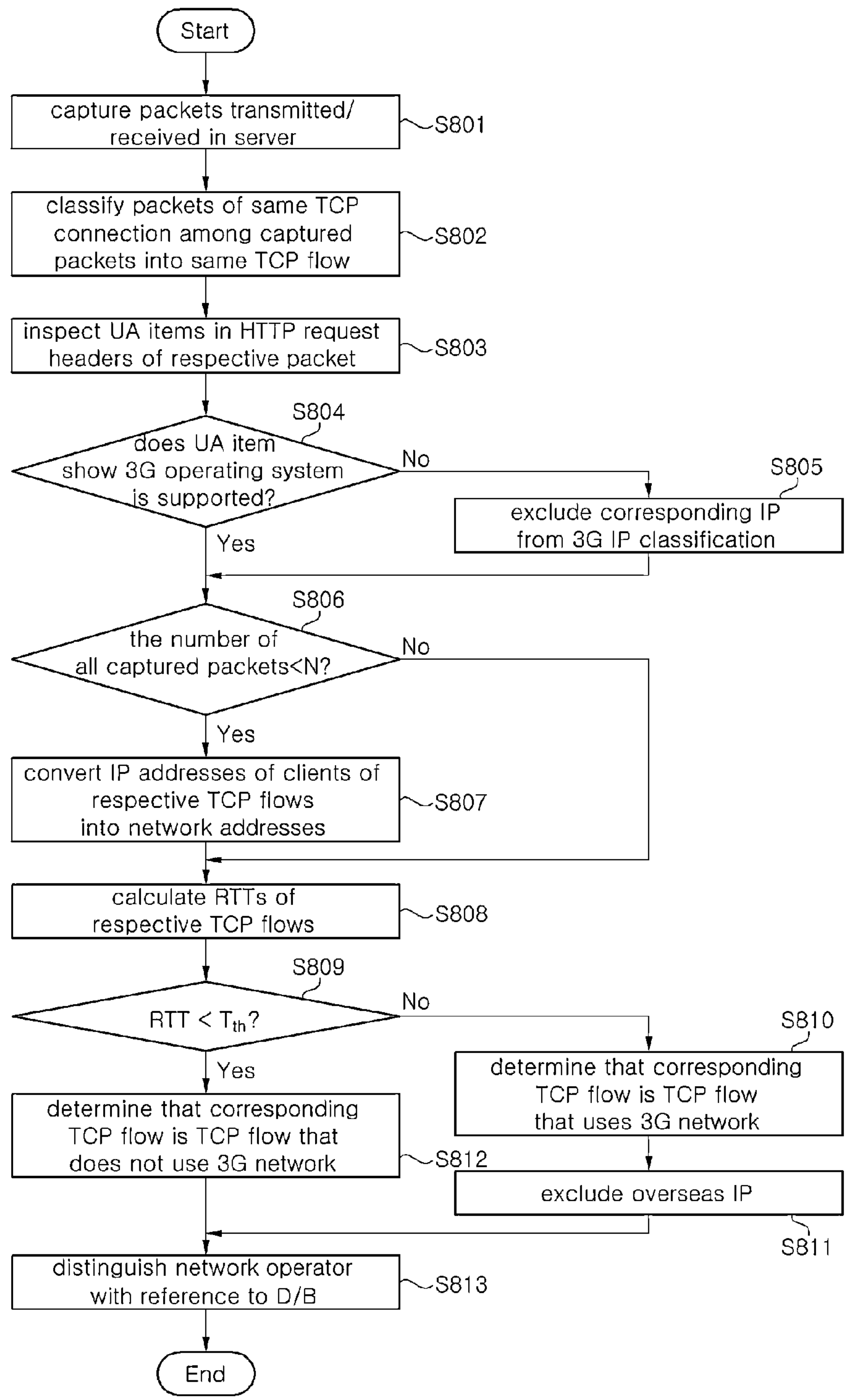
FIG. 8 is a flow chart illustrating a procedure of identifying an access network of a user terminal according to an exemplary embodiment.

FIG. 8 is a flow chart showing a procedure of identifying an access network of a user terminal according to an embodiment. After packets transmitted/received in the server are captured (S801), packets of the same TCP connection among the captured packets are classified into the same TCP flow (S802).

Then, according to the exemplary embodiment of the present invention, the UA items in the HTTP request headers of the respective packets are inspected (S803). As a result of the inspection, when a content of the UA item is not an operating system supporting the access of the 3G mobile communication network, the corresponding IP is excluded from the IP classification of the 3G mobile communication network (S805).

When the number of all captured packets is smaller than a set value N (S806), the IP addresses of the clients of the respective TCP flows are converted into the network addresses (S807) to determine the access network.

Next, the RTTs of the respective TCP flows are calculated (S808). When the calculated RTT value is smaller than a preset value (Tth), the corresponding TCP flow is determined to be the TCP flow that does not use the 3G mobile communication network (S812). On the other hand, when the calculated RTT value is larger than the preset value (Tth), the corresponding TCP flow is determined to be the TCP flow that uses the 3G mobile communication network (S810). In some embodiments, the overseas IPs are additionally excluded by various methods (for example, when the sum of the number of TCP flows classified into the TCP flows that use the 3G mobile communication network and the number of TCP flows classified into the TCP flows that do not use the 3G mobile communication network is a predetermined number or less, when the IP is determined to be the IP from the overseas using the Geo IP) (S811).

In some embodiments, the list of the network operator IP addresses received from the outside is stored in the database and the network operations are additionally distinguished with reference to the database (S813).

The above-mentioned respective procedures may be performed as shown or some procedures may be changed to be performed before or after other procedures. In addition, according to the exemplary embodiment of the present invention, some of the above-mentioned respective procedures may be omitted, and other procedures may be added.

Figure 11:
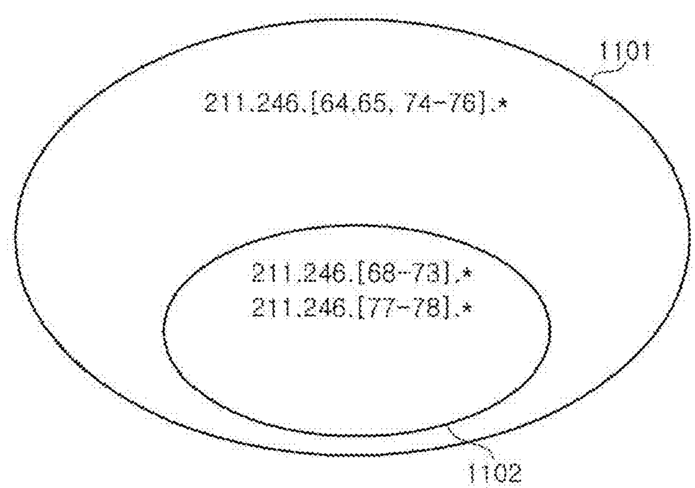
FIG. 11 illustrates IP address comparison between an identified user terminal and an actual network according to an exemplary embodiment.

FIG. 11 illustrates IP address comparison between an identified user terminal and a database provided from a network operator according to an embodiment. All of the IP addresses 1102 determined to use the 3G mobile communication network according to the exemplary embodiment are included in access IP addresses 1101 for the corresponding 3G mobile communication network actually provided from the network operators, such that reliability of a result is high.

The exemplary embodiments may be implemented in a form of program commands capable of being performed through various computer components to thereby be recordable in a computer-readable medium. The computer readable medium may include program instructions, data files, data structure, or the like, alone or a combination thereof. The program command recorded in the computer-readable medium may be designed and constituted especially for the present invention, or may be known to those skilled in a field of computer software. Examples of the computer-readable recording medium may include a magnetic medium such as a hard disk, a floppy disk, and a magnetic tape; an optical recording medium such as a CD-ROM, a DVD; a magneto-optical medium such as an optical disk; and a hardware device specially constituted to store and perform program commands such as a ROM, a RAM, a flash memory, or the like. Examples of the program commands may include machine language codes such as being made by compilers as well as high-level language codes capable of being executed by computers using interpreters, or the like. The hardware device may be constituted to be operated as one more software modules in order to perform the action according to the present invention, and vice versa.

Hereinabove, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments and the following claims as well as all modified equally or equivalently to the claims are intended to fall within the scope and spirit of the invention.

What is claimed is:

1. An apparatus for identifying an access network, the apparatus comprising:

a packet capturing unit configured to capture a plurality of packets transmitted or received by a server;

a flow classifying unit configured to classify each of the captured packets into individual flows with reference to at least one of an origination address, a destination address, and a port number;

a round trip time (RTT) calculating unit configured to calculate RTT values from the packets classified into a flow of the individual flows;

an access network determining unit configured to determine that an origination address included in a packet classified into the flow is an address accessing the server through a first communication network when the RTT calculated values exceed a reference value; and a storage unit configured to store the address accessing the server through the first communication network.

2. The apparatus of claim 1, wherein the reference value is set to a value in a range of 25 to 60 milliseconds (ms).

3. The apparatus of claim 1, wherein the first communication network comprises a 3G mobile communication network.

4. The apparatus of claim 1, wherein the flow is a Transmission Control Protocol (TCP) flow.

5. The apparatus of claim 1, wherein the RTT values comprise a time difference between a transmission time of a 'SYN+ACK packet' transmitted from the server and a reception time of a corresponding 'ACK packet'.

6. The apparatus of claim 1, wherein the access network determining unit compares a first count comprising a number of cases in which the calculated RTT values exceed the reference value with a second count comprising a number of cases in which the calculated RTT values do not exceed the reference value, and determines that the origination address is a terminal address accessing through the first communication network when the first count is greater than the second count, with respect to a plurality of flows received from the origination address.

7. The apparatus of claim 1, wherein the access network determining unit excludes a terminal address from a list of the first communication network when a sum of a number of cases in which the calculated RTT values exceed the reference value and a number of cases in which the calculated RTT values do not exceed the reference value is a preset number, with respect to a plurality of flows received from the terminal address.

8. The apparatus of claim 5, further comprising a user agent (UA) inspecting unit configured to inspect a UA item in header information of a packet captured through the flow and to exclude the packet's origination address from a list of the first communication network when the UA item is not a system configured to use the first communication network.

9. The apparatus of claim 8, wherein the packet captured through the flow is an 'HTTP request packet' transmitted to the server after transmission of the 'ACK packet'.

10. The apparatus of claim 1, further comprising an address converting unit configured to convert the origination address of a terminal on the respective flows into a network address to allow the access network determining unit to determine the access network with respect to the network address.

11. The apparatus of claim 10, wherein the origination address of the terminal comprises an Internet Protocol (IP) address of 32 bits, and the network address comprises a range of bits selected from upper 24 to 31 bits in the 32 bit IP address.

12. The apparatus of claim 1, further comprising an IP determining unit configured to determine whether the origination address of a terminal is an address received from overseas and to exclude the origination address of the terminal from a list of the first communication network.

13. The apparatus of claim 1, further comprising a network operator classifying unit configured to determine a network operator for the origination address of a terminal with reference to a network operator IP list database.

14. A method for identifying an access network, the method comprising:

capturing with a packet capturing unit a plurality of packets transmitted or received by a server;

classifying with a flow classifying unit each of the captured packets into individual flows with reference to at least one of an origination address, a destination address, and a port number;

calculating with a round trip time (RTT) calculating unit, RTT values from the packets classified into a flow of the individual flows;

determining with an access network determining unit that an origination address included in a packet classified into the flow is an address accessing the server through a first communication network when the RTT calculated values exceed a reference value; and storing with a storage unit the address accessing the server through the first communication network.

15. The method of claim 14, wherein the reference value is set to a value in a range of 25 to 60 milliseconds (ms).

16. The method of claim 14, wherein the RTT values comprise a time difference between a transmission time of a 'SYN+ACK packet' transmitted from the server and a reception time of a corresponding 'ACK packet'.

17. The method of claim 14, wherein the access network determining unit compares a first count comprising a number of cases in which the calculated RTT values exceed the reference value with a second count comprising a number of cases in which the calculated RTT values do not exceed the reference value, and determines that the origination address is a terminal address accessing through the first communication network when the first count is greater than the second count, with respect to a plurality of flows received from the origination address.

18. The method of claim 14, wherein the access network determining unit excludes a terminal address from a list of the first communication network when a sum of a number of cases in which the calculated RTT values exceed the reference value and a number of cases in which the calculated RTT values do not exceed the reference value is a preset number, with respect to a plurality of flows received from the terminal address.

19. The method of claim 16, further comprising inspecting with a UA inspecting unit a UA item in header information of a packet captured through the flow and to exclude the packet's origination address from a list of the first communication network when the UA item is not a system configured to use the first communication network.

20. One or more non-transitory computer-readable storage media having stored thereon a computer program that, when executed by one or more processors, causes the one or more processors to perform acts comprising:

capturing with a packet capturing unit a plurality of packets transmitted or received by a server;

classifying with a flow classifying unit each of the captured packets into individual flows with reference to at least one of an origination address, a destination address, and a port number;

calculating with a round trip time (RTT) calculating unit, RTT values from the packets classified into a flow of the individual flows;

determining with an access network determining unit that an origination address included in a packet classified into the flow is an address accessing the server through a first communication network when the RTT calculated values exceed a reference value; and storing with a storage unit the address accessing the server through the first communication network.

* * * * *